UNITED STATES PATENT OFFICE.

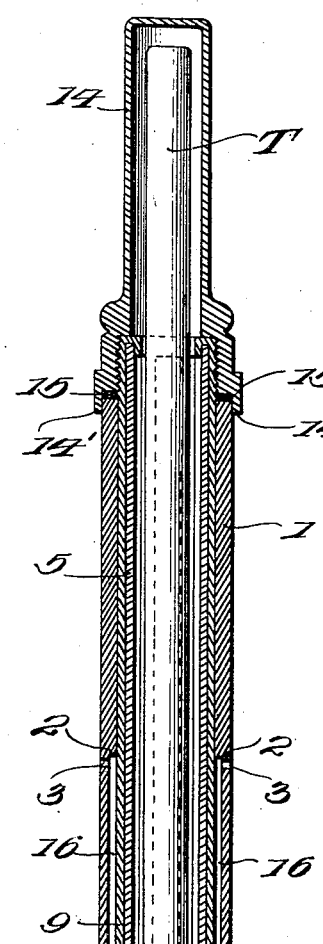

OSCAR GRAY, OF LITTLE ROCK, ARKANSAS.

CLINICAL-THERMOMETER CASE.

1,095,854.  Specification of Letters Patent.  Patented May 5, 1914.

Application filed December 22, 1913. Serial No. 808,249.

*To all whom it may concern:*

Be it known that I, OSCAR GRAY, a citizen of the United States, residing at Little Rock, in the county of Pulaski and State of Arkansas, have invented certain new and useful Improvements in Clinical - Thermometer Cases; and I do declare the following to be a full, clear, and exact description of the invention, such as will enable others skilled in the art to which it appertains to make and use the same.

This invention relates to improvements in cases for clinical thermometers and more especially to aseptic cases.

The object of the invention is to provide a simply constructed case of this character which will insure at all times a clean sterile thermometer ready for instant use, thereby preventing danger of the spread of infectious diseases.

With this and other objects in view, the invention resides in certain novel features of construction, and the combination and arrangement of parts as will be more fully described and claimed.

In the accompanying drawings:—Figure 1 represents a longitudinal section of a case constructed in accordance with this invention with a thermometer shown incased therein. Fig. 2 is a similar view of the inner casing. Fig. 3 represents a side elevation of the combined plunger and basket removed with the plunger shown partially in section. Fig. 4 is a transverse section taken on the line 4—4 of Fig. 1.

In the embodiment illustrated, the case shown comprises an outer tubular casing 1 composed of hard rubber having a slight elasticity or of any other suitable substance or material. This outer casing 1 has a portion of its inner face or wall cut out to reduce the thickness of the casing, said reduced portion terminating in an interior annular shoulder 2 formed about mid-way the length of the casing, and air vents 3 are formed adjacent this shoulder in the thin wall of the casing. One end of this casing 1 is exteriorly threaded to receive a cap 4 which is interiorly threaded for engagement with the threaded end of the outer casing, as is shown clearly in Fig. 1. A tubular inner casing 5 of smaller diameter than the outer casing 1 is disposed within the casing 1 and has a rounded head or closure 6 at one end which projects laterally beyond the outer face of the casing 5 and is provided with an annular shoulder 7 which forms a seat for the threaded end of the outer casing. The head 6 is shaped to conform to the inner face of the cap 4 and to fit snugly therein, a packing 8 being arranged between the end of the casing 1 and the shoulder 7, if desired or found necessary to render the connection fluid tight. The open end of the inner casing 5 projects beyond the end of the outer casing 2 for a purpose to be described.

A tubular plunger 9 is designed to encircle the inner casing 5 and engage said casing forming a fluid tight connection between them, said plunger being, however, slidable relatively to said inner casing. This plunger 9 has an annular laterally extending head 10 at one end and a thermometer receiving basket 11 is connected with the other end being shown made integral therewith and is disposed within said plunger, being spaced a sufficient distance therefrom to form a pocket for the reception of the inner casing 5. This plunger 9 is substantially of the same length as the side walls of the inner casing 5, and the basket 11 which is inserted in said inner casing projects at its free end slightly beyond the head 10 of the plunger 9, and is adapted to be seated in the closed end of the casing 5, which is shaped to conform to said closed basket end. When the basket and plunger are disposed in operative position with the casing, the free end of the plunger will terminate a slight distance from inner face of the head 6 of the inner casing 5, thereby forming an annular chamber 12 at the inner end of the plunger, and this chamber communicates with the interior of the inner casing by means of apertures 13 formed in the wall of the casing 5 at its inner end.

The basket 11 which is made integral at its upper end with the upper end of the plunger is preferably constructed of four thin strips 11' connected at their inner ends to form a support for the thermometer to be protected and is provided with four vents 11'' between said strips to permit the free passage of the sterilizing fluid and its free circulation around the thermometers. A cap 14 is interiorly threaded for engagement with exterior threads formed on the end of the plunger which is connected with the basket 11 and is adapted to fit over one end of the thermometer T, and thus completely incase it as will be hereinafter described. This cap 14 has an offset annular flange 14' at its free end which is adapted to fit over the outer end of the outer casing 1 as is shown clearly in Fig. 1 and if found necessary, a suitable packing 15 may be arranged between the cap 14 and the casing 1 to provide a fluid tight connection between them. A chamber 16 is formed between the thin wall of the casing 1 and the outer face of the plunger 9, the shoulder 2 and the plunger head 10 forming the end walls of said chamber. This chamber 16 is an air chamber and communicates with the outside atmosphere through the vents 3 to provide for the movement of the plunger within the casing.

In assembling the parts of this case, the inner casing 5 is first inserted between the basket 11 and plunger 9, and the outer casing is then placed over the plunger and the cap 4 screwed into engagement with the threaded end thereof. The case is then filled or partially filled with a suitable sterilizing fluid which may be composed of an aqueous or alcoholic solution of bichlorid or cyanid of mercury in the strength necessary to kill pathogenic bacteria. A thermometer is then dropped into the casing and is surrounded by the liquid therein, which thoroughly sterilizes it. After the thermometer has been inserted, the cap 14 is screwed onto the plunger 9 and is forced into engagement with the outer end of the outer casing 1 and this case may then be disposed at any angle without danger of leakage.

When it is desired to remove the thermometer from its case, an outward pull is exerted on the cap 14 which will draw out the plunger and the basket 11 connected therewith. During the outward movement of the plunger, the fluid in the casing will pass automatically into the chamber 12 and will follow the plunger in its outward movement, filling the space between the outer and inner casings, the air in the chamber 16 being forced outward through the vents 3 during this outward movement of the plunger. A thermometer automatically rises in the basket as the cap attached to the plunger is drawn out, and the cap 14 may then be unscrewed and the thermometer removed. The fluid following the plunger prevents danger of its becoming spilled during the removal of the thermometer. The cap 14 is then again screwed onto the plunger 9, until it is desired to again insert the thermometer within the case, when the cap 14 may be removed, the thermometer replaced in the basket, and the plunger forced inwardly, thereby driving the fluid back through vents 11'' and 13 into the casing 5 where it will surround and sterilize the thermometer. The force, required to push the fluid from the outer chamber 16 in through the vents 11'' and 13 of the basket 11 and inner casing 5, will create friction and agitate the liquid around the mercurial end of the thermometer thereby thoroughly cleansing it.

From the above description, it will be obvious that this casing may be readily disassembled for cleaning and other purposes, both caps being removable and all of the parts being separable.

I claim as my invention:—

1. An aseptic case for clinical thermometers comprising casings arranged one within the other and spaced apart, a closure connecting one end of said casings, a plunger arranged to slide between said casings from the end opposite said closure, the inner casing having apertures in its side wall at its inner end in advance of the plunger head, a cap removably connected with said plunger, and thermometer supporting means connected with said plunger, and extending into said inner casing.

2. An aseptic case for clinical thermometers comprising tubular members of different diameters arranged one within the other, means for closing and connecting one end of said members, a plunger slidable between said members from the end opposite said closure, a thermometer support in said inner member connected to move with said plunger, and a combined closure and plunger operating device connected with the plunger and overlapping the outer member.

3. A thermometer case comprising tubular casings of different diameters arranged one within the other, a closure for one end of said casings carried by one of them and having a seat to receive the other, means for securing the casing in the seat of said closure, a plunger arranged between said casings and having a basket disposed within the inner casing to support a thermometer, and means for closing the other end of the casings removably connected with said plunger.

4. A thermometer case comprising a casing having a head at one end extending laterally beyond the side walls thereof and provided with a seat, another casing surrounding said first mentioned casing and spaced therefrom with one end adapted to seat in the head of said first mentioned casing, means for connecting said outer casing with said head, said outer casing having its walls reduced on its inner face for a portion of its length, said reduced walls terminating in an interior shoulder, a plunger slidable between said casings and having a laterally extending head at its inner end, said head forming in connection with said shoulder an air space between the plunger and the outer casing, a thermometer support connected with said plunger, and means for actuating said plunger.

5. A thermometer case comprising a casing having a head at one end extending laterally beyond the side walls thereof and provided with a seat, another casing surrounding said first mentioned casing and spaced therefrom with one end adapted to seat in the head of said first mentioned casing, means for connecting said outer casing with said head, said outer casing having its walls reduced on its inner face for a portion of its length, said reduced walls terminating in an interior shoulder, a plunger slidable between said casings and having a laterally extending head at its inner end, said head forming in connection with said shoulder an air space between the plunger and the outer casing, a thermometer support connected with said plunger, said plunger being exteriorly threaded at its outer end and a cap interiorly threaded for engagement with the threaded end of the plunger and having an offset flange for engaging the outer end of the outer casing.

In testimony whereof I have hereunto set my hand in presence of two subscribing witnesses.

OSCAR GRAY.

Witnesses:
LEE MILES,
JOHN W. WADE.

Copies of this patent may be obtained for five cents each, by addressing the "Commissioner of Patents, Washington, D. C."